(12) United States Patent
Snyder

(10) Patent No.: US 8,306,568 B2
(45) Date of Patent: Nov. 6, 2012

(54) SOLUTION FOR QUEUE HANDLING

(75) Inventor: Michael Ray Snyder, Fletcher, NC (US)

(73) Assignee: Q-Matic AB, Molndal (SE)

( * ) Notice: Subject to any disclaimer, the term of this patent is extended or adjusted under 35 U.S.C. 154(b) by 649 days.

(21) Appl. No.: 12/489,744

(22) Filed: Jun. 23, 2009

(65) Prior Publication Data

US 2009/0325629 A1 Dec. 31, 2009

Related U.S. Application Data

(60) Provisional application No. 61/075,201, filed on Jun. 24, 2008.

(51) Int. Cl.
*H04B 7/00* (2006.01)

(52) U.S. Cl. ........... 455/526; 455/41.2; 455/42; 455/71; 455/108; 455/435.1; 455/507; 463/40; 370/348

(58) Field of Classification Search ................ 455/526, 455/41.2, 42, 70, 71, 102, 108, 435.1, 466, 455/500, 507; 705/5, 6, 15; 463/40; 370/348; 348/155

See application file for complete search history.

(56) References Cited

U.S. PATENT DOCUMENTS

| | | | | |
|---|---|---|---|---|
| 5,245,163 | A | * | 9/1993 | Bar-Yehuda ................. 235/377 |
| 5,502,806 | A | * | 3/1996 | Mahoney et al. ............ 715/839 |
| 5,953,055 | A | * | 9/1999 | Huang et al. ................. 348/155 |
| RE42,759 | E | * | 9/2011 | Olewicz et al. ................ 705/15 |
| 2003/0061080 | A1 | * | 3/2003 | Ross ................................ 705/6 |
| 2006/0166740 | A1 | * | 7/2006 | Sufuentes ....................... 463/40 |
| 2008/0133283 | A1 | * | 6/2008 | Backer et al. .................... 705/5 |
| 2010/0250381 | A1 | * | 9/2010 | Snyder ........................... 705/21 |
| 2010/0317377 | A1 | * | 12/2010 | Zou et al. ..................... 455/466 |

FOREIGN PATENT DOCUMENTS

GB  2 357 393  6/2001

\* cited by examiner

*Primary Examiner* — Shaima Q Aminzay
(74) *Attorney, Agent, or Firm* — Nixon & Vanderhye P.C.

(57) ABSTRACT

Technology is provided for a plurality of people that are waiting for a service/meeting with information relating to the queue. A registration unit is arranged to place people waiting for a service/meeting in a queue. At least one radio transmitter is arranged to transmit information relating to the queue to unidentified radio receivers so that the people may receive the information via the unidentified radio receivers.

14 Claims, 2 Drawing Sheets

SOLUTION FOR QUEUE HANDLING

This application claims priority to U.S. Provisional Application No. 61/075,201 filed Jun. 24, 2008, the entire contents of which is hereby incorporated by reference.

TECHNICAL FIELD

The present invention concerns a system, method and computer program for providing a plurality of people that are waiting for a service/meeting with information relating to the queue.

BACKGROUND

As in many other industries, establishments in the financial, healthcare, public and retail sectors must provide a widening range of services to an ever-growing number of clients/patients in an organized and cost-effective manner in which client/patient flow is improved and efficiency is maximized.

Most establishments utilize a queuing system in which people waiting for a service/meeting stand in one or more lines awaiting their turn to be served/seen. Alternatively, people are placed in a queue, either by means of having their name written down on a list or by receiving a numbered ticket from a dispenser. Notification of when a person has reached the front of the queue is effected largely by means of one or more continuously updated visual displays that are placed in a waiting room/area at convenient locations so that waiting people can consult the display from time to time to gather the necessary information concerning when it is their turn to be served/seen and/or by means of audio announcements.

These presently used notification systems, although generally satisfactory, are, under certain circumstances, somewhat unreliable since they rely on people inspecting/listening to the displayed/announced information at frequent intervals.

Furthermore, waiting rooms/areas, where people can sit or stand until it is their turn to be served/seen may become overcrowded and/or noisy, which may encourage people to wait outside the waiting room/area in another part of the building or outside the building. A burden is then placed on waiting people to periodically enter the waiting room/area to check their place in queue so as not to risk missing their turn to be served/seen.

UK patent application no. GB 2 357 393 concerns an information transmission system, that is particularly suitable for providing flight departure information to airport passengers via SMS messages transmitted to mobile phone receivers owned by or loaned to passengers. SMS messages are namely generated and transmitted to the mobile phones of airport passengers to notify them of check-in times, flight data and possible delays.

A disadvantage of such a system is that it requires means to register the mobile telephone number of each airport passenger. Furthermore, if an airport passenger does not own, or is not carrying a mobile telephone, the system requires at least one person to be responsible for the distribution and subsequent retrieval of loaned mobile telephones. Substantial resources as regards hardware, software and personnel are required to handle the storage of mobile telephone numbers as well as the generation and sending of SMS messages and the distribution and subsequent retrieval of loaned mobile telephones, especially if the system is used at a busy airport through which up to one hundred thousand airport passengers may pass.

SUMMARY

An object is to provide an improved system for providing a plurality of people that are waiting for a service/meeting with information relating to the queue.

This object is achieved by a system that comprises a registration unit that is arranged to place people waiting for a service/meeting in a queue, i.e. to assign each person with a particular place in a queue, by giving them a number for example. The registration unit may be a registering device or a human being. The system also comprises at least one radio transmitter that is arranged to transmit information relating to the queue to unidentified radio receivers, whereby the people receive information relating to the queue via their unidentified radio receiver.

The expression "unidentified radio receiver" as used in this document is intended to mean any radio receiver whose contact information, such a telephone number or e-mail address does not have to be obtained or stored by the system, the radio receiver merely has to be able to pick up signals of a certain frequency, for example using an FM antenna that is integrated into a device.

The radio receiver may for example be located in the radio of a vehicle or a mobile telephone, media player, Personal Communications System (PCS) terminal, Personal Data Assistant (PDA), laptop computer, palmtop receiver, camera, television or any appliance that includes a transducer designed to receive radio signals, whereby the electronic circuit receives its input from an antenna and converts the input into a signal such as an audio signal, a picture, digital data etc. The expression includes radio receivers that are arranged to receive and transmit audio signals only, but is not limited thereto.

The expression "radio transmitter" is intended to mean an electronic device, which, usually with the aid of an antenna, propagates an electromagnetic signal, such as radio, television, or other telecommunications signals.

According to an example embodiment the information relating to the queue is information concerning a person's place in the queue, such as "number XX is now being served" and/or expected remaining waiting time, such as "waiting time for number XX is expected to be XX minutes". It should be noted that the information relating to the queue is not targeted to a specific person, but sent to everybody in the queue who tunes their unidentified radio receiver to the frequency on which such information may be received.

Such a system may help to create better client service and provide increased client satisfaction, it may increase throughput and consequently increased revenue for an establishment using such a system. The system is cost-effective and enhances client/patient flow and may increase the overall efficiency of the establishment in which it is used. Such a system allows a person to wait outside of a designated waiting room/area, such as in his/her car in a car-park outside a building in which the service/meeting will take place. A person may thereby wait in a comfortable, non-stressful environment while not running the risk of missing his turn to be served/seen.

According to an example embodiment the at least one radio transmitter is an FM transmitter. An FM transmitter is an electronic device which, with the aid of an antenna, propagates an electromagnetic signal such as radio, television, or other telecommunications.

According to an example embodiment the system comprises a ticket/message issuing means, such as a ticket/message issuing device, that is arranged to provide people waiting for a service/meeting with a frequency to which they should tune their unidentified radio receiver in order to receive the information relating to the queue. The ticket/message issuing means may be located at the same location as where the service/meeting is to take place or at a location remote thereto. A message may for example be posted on the walls of a waiting area/room of a building in which the service/meeting is to take place or given to a person when he/she registers to be put in a queue or is registered (by someone else) to be placed in a queue.

It should be noted that both the ticket/message issuing means and the registration unit may be devices, whereby the entire system may be automated and thus not require a human being to form and manage a queue. It also be noted that the system may be used to form and manage a plurality of queues simultaneously.

According to an example embodiment the registration unit is arranged to allow people wanting to be placed in the queue to be register themselves or be registered at a location where the service/meeting is to take place. Alternatively or additionally, the registration unit device is arranged to allow people wanting to be placed in the queue to register themselves or be registered from a location remote to the location where the service/meeting is to take place. A person may therefore register or be registered to be placed in a queue, while he/she is at home or from his/her vehicle so that he/she need only enter a building at which the service/meeting is to take place when it is his/her turn to be served/seen. It should be noted that, in all embodiments a service/meeting need not necessarily take place in a building.

According to an example embodiment the registration unit is arranged to allow people waiting for a service/meeting to select the type of information relating to the queue they wish to receive via their unidentified radio receiver. For example, a person may choose to receive information concerning the establishment at which the service/meeting is to take place or music, which may be broadcast in between the information relating to the queue. Such a feature would still not require a system to obtain or store contact information concerning a particular person, it would merely require the system being configured to provide different types of information on different channels/frequencies, whereby a person could select a desired channel/frequency.

According to an example embodiment the at least one radio transmitter may be arranged to transmit information relating to the queue to unidentified radio receivers (removably or non-removably) located in vehicles that are located in the vicinity of where said service/meeting is to take place, such as cars parked in a car park outside a building in which the service/meeting is to take place, whereby said people may receive said information while waiting in their vehicles.

The technology in this application also concerns a method for providing a plurality of people that are waiting for a service/meeting with information relating to the queue. The method comprises the steps of: placing a plurality of people waiting for a service/meeting in a queue and transmitting information relating to the queue, and optionally other information, to unidentified radio receivers, whereby people may receive information relating to the queue via said unidentified radio receivers irrespective of where they are waiting. Further embodiments of such a method are provided in the accompanying dependent method claims.

The technology in this application further concerns a computer program, for instance distributable as a computer program product, that comprises a computer program stored on a computer-readable medium or a carrier wave and comprising instruction sets arranged to cause a computer or a processor to execute at least the steps of placing at least one person in a queue, keeping track of current queue position, and transmitting current queue position to the person using a radio transmitter broadcasting to unidentified radio receivers.

The system, method and computer program product are intended particularly, but not exclusively to any establishments in the financial sector, such as a bank, the healthcare sector, such as a hospital or doctor's surgery, the public sector, such as central or local government offices, post offices, motor vehicle agencies, embassies or consulates and the retail sector, such as a supermarket or shop. The technology in this application is however applicable to any other establishment requiring some type of queuing management and particularly to establishment where people can wait in a vehicle, such as a ferry terminal or amusement park.

BRIEF DESCRIPTION OF THE DRAWINGS

The technology in this application will hereinafter be further explained by means of non-limiting examples with reference to the appended figures where.

It should be noted that the drawings have not been drawn to scale and that the dimensions of certain features have been exaggerated for the sake of clarity.

DETAILED DESCRIPTION OF EXAMPLE EMBODIMENTS

Figure 1:
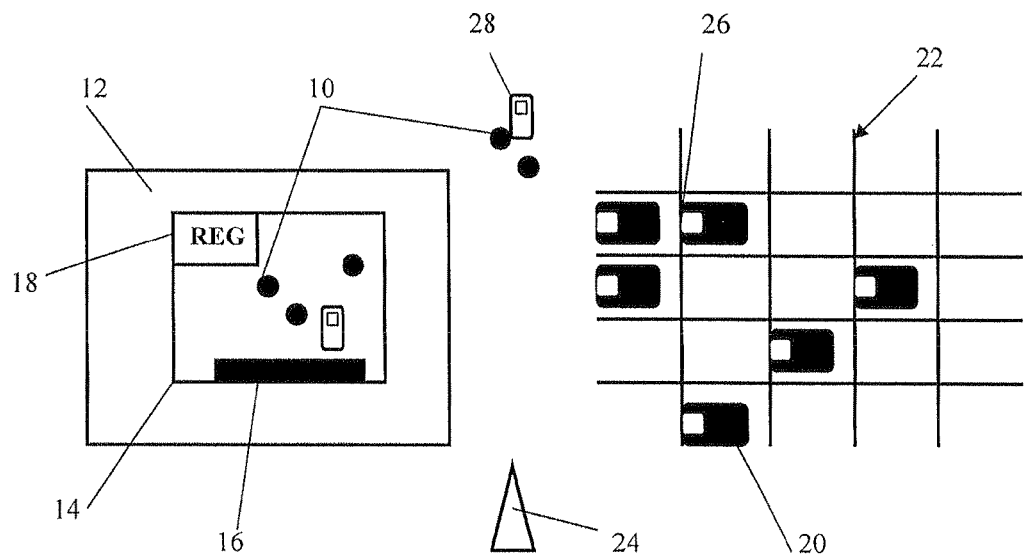
FIG. 1 schematically shows a system.

FIG. 1 shows a system for providing a plurality of people 10 that are waiting for a service/meeting in a building 12 with information relating to the queue in which they are in. The building 12 illustrated in FIG. 1 comprises a waiting room 14 in which a conventional display means 16 indicates the number of the person that is currently being served/seen. The people 10 may obtain such a number, i.e. may be placed in the queue by taking a numbered ticket from a ticket dispenser that constitutes part of a registration unit 18 located in the waiting room 14. Alternatively, a person may receive a number by sending an SMS or e-mail to the registration unit 18 from his/her home or from his/her vehicle 20 that is parked in the car park 22 located outside the building 12. The registration unit may comprise a queue management system comprising a user interface and queue management software handling the queue and information relating to the queue, such as number of waiting person, average and/or estimated waiting time, information relating to the queuing persons, service requested, and so on. The queue management software may be provided with instruction sets for determining priority of certain persons or services requested.

The system also comprises a radio transmitter 24, e.g. an FM (Frequency Modulated) or AM (Amplitude Modulated) transmitter, which is arranged to transmit and broadcast information relating to the queue to unidentified radio receivers, such as vehicle radio receivers 26 or mobile telephones 28 capable of receiving radio transmission and have been tuned to the transmission frequency of the queue information. It should be noted that the system may comprise any number of radio transmitters 24 each having any desired transmission range or transmission type. Signals may for example be sent between pluralities of radio transmitters in order to reach unidentified radio receivers 26, 28 in any desired area. The radio transmitter is advantageously a short to medium range radio transmitter, i.e. radio transmission range is a few meters to some hundred meters, e.g. from 10 meters to 1000 meters. However, the range may be extended either directly by increasing transmission power or by relaying radio transmissions via intermediate radio transmitters, e.g. by radio transceivers equipped by the persons in the queue. In a normal situation, users obtain a queue position from a queue dispensing device, leave the premises of the queue dispensing device, e.g. moves to their vehicle, and wait for their queue position to come up in a radio broadcast message receivable by their vehicle radio receiver or similar radio receiving device. Thus the user does not necessarily have to wait in a specific location.

The radio transmitter may also be configured to transmit other information, such as commercial information, e.g. ads or similar, or such as music or radio show programs; transmitting music or radio show programs allows the user to listen to the radio and more enjoyable pass their waiting time.

The expression "unidentified radio receiver" as used in this document is intended to mean any radio receiver whose contact information, such a telephone number or e-mail address does not necessarily need to be obtained or stored by the system, a user radio receiver merely has to be able to pick up signals of a certain frequency, for example using a radio antenna that is integrated into a user device.

The radio receiver may for example be located in the radio of a vehicle or a mobile telephone, media player, Personal Communications System (PCS) terminal, Personal Data Assistant (PDA), laptop computer, smart phone, palmtop receiver, camera, television receiver, or any appliance that includes a receiver designed to receive radio signals, whereby the electronic circuit receives its input from an antenna and converts the input into a signal such as an audio signal, a picture, digital data, or similar. The expression includes radio receivers that are arranged to receive and transmit audio signals only, but is not limited thereto.

In a further embodiment, queue information may be transmitted using an RDS (Radio Data System) signal, whereby it is possible to transmit text information to an RDS enabled radio receiver: for instance using a traffic information solution, e.g. TMC, for transmitting information thus enabling the user to listen to any channel of the radio.

In order to facilitate for the queuing person in obtaining the radio transmitted queue information, the transmission frequency may for example be displayed on the walls of the waiting room 14, on the display means 16 located in the waiting room, and/or may be typed on the tickets dispensed from the ticket dispenser of the registration unit 18. Furthermore, the queue position may be transmitted on several frequencies at a time, such as to be received in a radio receiver at any frequency. This allows the queuing person to receive the queue position independent on which radio channel that the radio is tuned into; it should be noted that this may not be applicable to all jurisdictions, depending on local radio transmitting laws.

Figure 2:
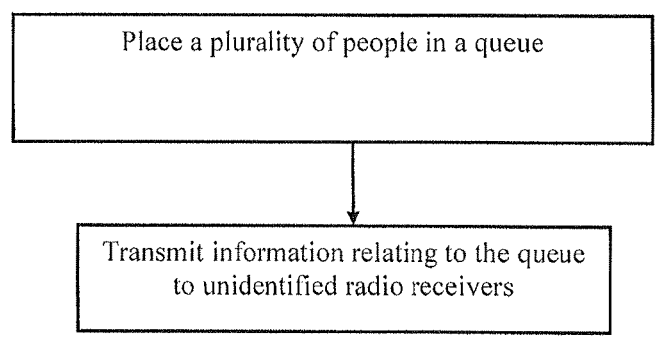
FIG. 2 is a flow diagram showing the steps of a method according to an example embodiment.

FIG. 2 shows the steps of a method for providing a plurality of people that are waiting for a service/meeting with information relating to the queue. The method comprises the steps of placing a plurality of people waiting for a service/meeting in a queue, by assigning a number to each person by any conventional means and transmitting information relating to the queue to unidentified radio receivers, whereby the people may receive the information via the unidentified radio receivers.

Figure 3:
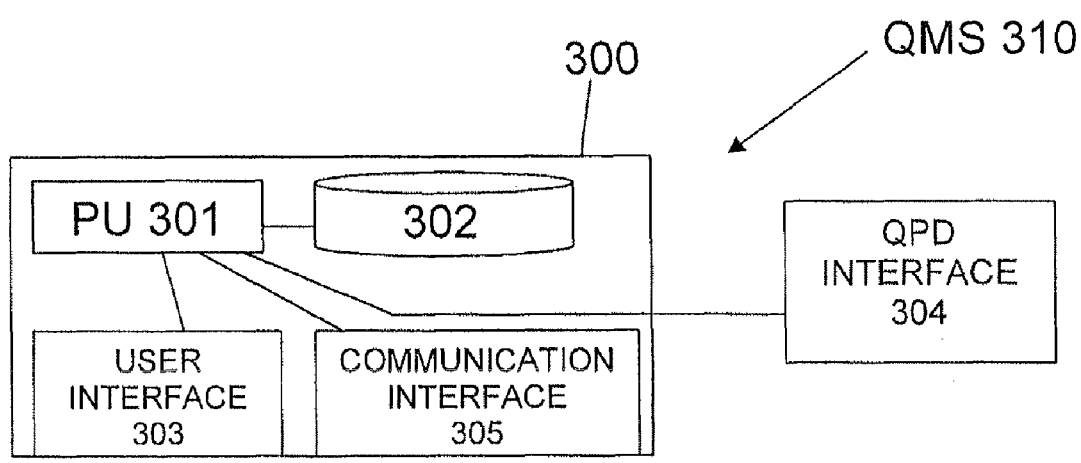
FIG. 3 is a schematic block diagram of a queue management system.

The queue management system 310 is illustrated in FIG. 3 and comprises a processing device 300 comprising at least one processing unit 301, a memory unit (volatile and/or non-volatile type) 302, a user interface 303, queue position dispensing interface 304, e.g. a ticket dispenser and/or radio transmitter, and optionally a communication interface 305 for communicating with peripheral devices, e.g. transmitting queue position information on a network. The queue position dispensing interface 304 may be built in into the processing device 300.

Further modifications within the scope of the claims will be apparent to a skilled person. It is for example evident that the claimed technology may be used to place just one person in a queue.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means" or "units" may be represented by the same item of hardware.

The above mentioned and described embodiments are only given as examples and should not be limiting to the claims. Other solutions, uses, objectives, and functions within the scope of the claims should be apparent for the person skilled in the art.

The invention claimed is:

1. A system for providing a plurality of people that are waiting in a queue for a service or a meeting with queue information, said system comprising:
   a registration unit is arranged to place people waiting for a service or a meeting in a queue, and
   at least one radio transmitter is arranged to broadcast information relating to the queue to unidentified radio receivers,
   wherein said people may receive said information via said unidentified radio receivers.

2. The system according to claim 1, wherein said information relating to the queue comprises information concerning a person's place in said queue and/or expected remaining waiting time.

3. The system according to claim 1, wherein said at least one radio transmitter is a frequency modulated (FM) transmitter.

4. The system according to claim 1, wherein the at least one radio transmitter is an Amplitude Modulated (AM) transmitter.

5. The system according to claim 1, wherein said registration unit is arranged to allow people wanting to be placed in said queue to be registered at a location where said service or said meeting is to take place.

6. The system according to claim 1, wherein said registration unit is arranged to allow people wanting to be placed in said queue to be registered from a location remote to the location where said service or said meeting is to take place.

7. The system according to claim 1, wherein said registration unit is arranged to allow people waiting for said service or said meeting to select the type of information relating to the queue they wish to receive via their unidentified radio receiver.

8. A method for providing a plurality of people that are waiting for a service or a meeting with queue information, which comprises the steps of:
   placing a plurality of people waiting for a service or a meeting in a queue by providing at least one queue number, and
   broadcasting information relating to the queue to unidentified radio receivers, whereby said people may receive said information via said unidentified radio receivers.

9. The method according to claim 8, wherein said information relating to the queue is transmitted using at least one frequency modulated (FM) transmitter.

10. The method according to claim 8, wherein the information relating to the queue is transmitted using at least one amplitude modulated (AM) transmitter.

11. The method according to claim 8, wherein further comprising the step of registering people waiting for said service or said meeting locally at a location where said service or said meeting is to take place.

12. The method according to claim 8, wherein further comprising the step of registering people waiting for said service or said meeting remotely from a location remote to the location where said service or said meeting is to take place.

13. The method according to claim 8, wherein further comprising the step of allowing people waiting for said service or said meeting to select the type of information relating to the queue they wish to receive via their unidentified radio receiver.

14. A computer program for managing a queue stored in a non-transitory, computer-readable medium and comprising instruction sets arranged to cause a processor to execute at least the steps of:

placing at least one person in the queue;

keeping track of current queue position; and transmitting current queue position using at least one radio transmitter broadcasting queue information to unidentified radio receivers.

* * * * *